Oct. 16, 1923.
A. PUGLIESE
1,471,202
NONSKID TREAD FOR VEHICLE WHEELS
Filed Jan. 31, 1923
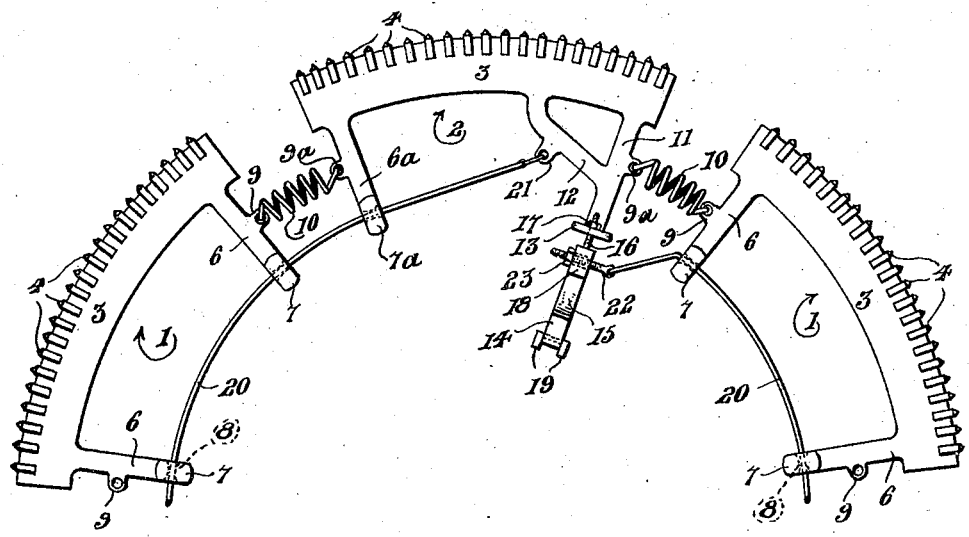
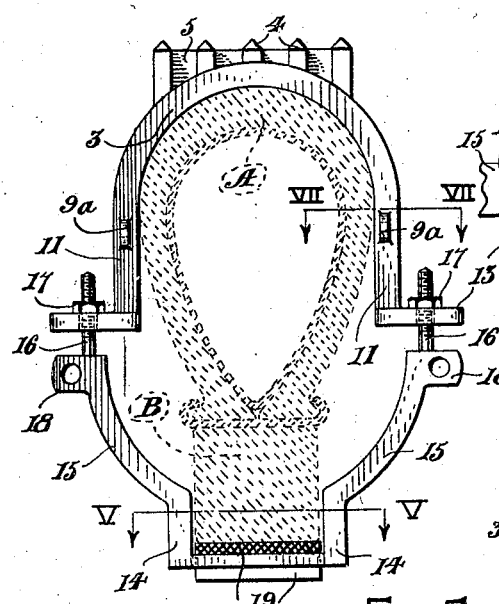
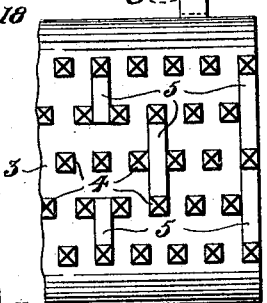
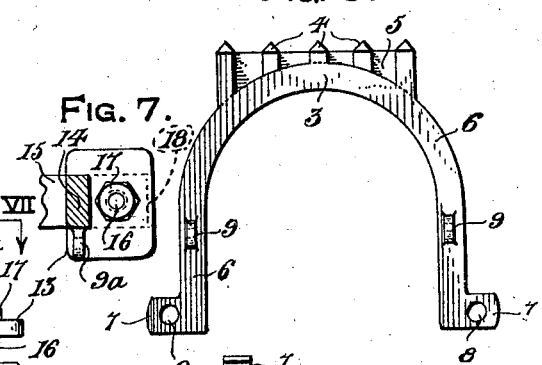
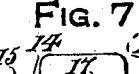
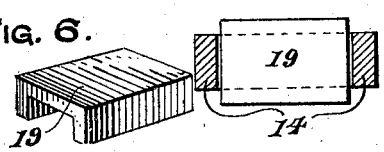
Inventor
A. Pugliese
By F. N. Bryant
Attorney.

Patented Oct. 16, 1923.

1,471,202

UNITED STATES PATENT OFFICE.

ANGELO PUGLIESE, OF NEW YORK, N. Y.

NONSKID TREAD FOR VEHICLE WHEELS.

Application filed January 31, 1923. Serial No. 616,144.

*To all whom it may concern:*

Be it known that I, ANGELO PUGLIESE, a subject of the King of Italy, residing at New York, in the county of New York and State of New York, have invented certain new and useful Improvements in Nonskid Treads for Vehicle Wheels, of which the following is a specification.

This invention relates to certain new and useful improvements in non-skid tread for vehicle wheels and more particularly to a tread adapted for mounting upon a pneumatic tire of an automobile wheel.

The primary object of the invention is to provide a non-skid tread for vehicle wheels wherein the tread is formed of resiliently connected link sections or units transversely curved coincident to the curvature of the tread portion of a pneumatic tire with a connecting cable for the unit at each side thereof for anchoring the same upon a tire.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view of a portion of a non-skid tread for vehicle wheels constructed in accordance with the present invention showing the resiliently connected tread sections, and the cable and clamp for anchoring the same upon a wheel.

Figure 2 is an end elevational view of one of the tread sections with the wheel anchoring clamp connected thereto, and showing by dotted lines a pneumatic tire and wheel felly, Figure 3 is an end elevational view of another tread section, Figure 4 is a fragmentary top plan view of one of the tread sections showing the web connected anti-skid lugs or spurs, Figure 5 is a detail sectional view taken on line V—V of Fig. 2 showing the rubber bumper or block interposed between the anchoring clamp and wheel felly, Figure 6 is a perspective view of the bumper block, and Figure 7 is a detail sectional view taken on line VII—VII of Fig. 2.

Referring more in detail to the accompanying drawing, there is illustrated a non-skid tread for vehicle wheels, especially designed for automobile wheels equipped with pneumatic tires, the non-skid tread being formed of a plurality of sections 1 and a single section 2, shown in detail in Figures 2 and 3.

Each of the tread sections includes a tread plate 3, transversely curved coincident to the curvature of the tread portion of the tire A and carrying upon the outer face thereof a plurality of anti-skid studs or spurs 4 of various lengths, as shown in Figs. 2 and 3 to present the outer terminal and in alinement, certain ones of said spurs being connected by a web 5 as shown in Fig. 4.

The opposite ends of the tread sections 1 at each side thereof carry inwardly directed arms 6 provided with outwardly directed lugs 7 upon the terminal ends thereof, the lugs being apertured as at 8 as clearly shown in Fig. 3. The outer faces of the arms 6 intermediate the ends thereof, are provided with apertured ears 9, and when the several tread sections are mounted upon the tire A, coil springs 10 connect the adjacent apertured ears 9 at each side of the tire.

Inwardly directed arms 6ª and 11 are carried by the opposite ends of each side of the tread section 2; the arms 6ª carry outwardly directed apertured lugs 7ª and apertured ears 9ª for association with the adjacent coil spring 10. The arm 11ª is provided with an apertured ear 9ª intermediate its end as shown in Figs. 1 and 2, while a diagonal brace bar 12 extends between the arm 11 and the tread plate 3 of the section 2. The free end of each arm 11 carries an outwardly directed flange 13 with which a U-shaped shackle or clamp is associated, the clamp embodying an intermediate bar portion 14 inclosing the inner face of the felly B of an automobile wheel and carrying outwardly directed arms 15 provided with screw studs 16 upon the ends thereof that pass through openings in the flanges 13 to be retained therein by the clamping nuts 17, the free end of each arm 15 being provided with an outwardly directed apertured lug 18. As shown in Figs. 2, 5 and 6, an inverted U-shaped rubber buffer block 19 is interposed between the wheel felly B and the central bar portion 14 of the shackle or clamp to prevent damage to the felly. The tread sections 1 and 2 are further anchored on the tire and felly by a cable 20 disposed at each side of the wheel, one end of the cable being anchored in the apertured ear 21 carried by the diagonal brace bar 12 shown in Fig. 1, the cable 20 passing through the apertured lugs 7 and 7ª and carrying at its opposite end a screw bolt 22 that passes through the apertured lug 18 of the clamp and anchored therein by the lock nut 23.

From the above detailed description of the device, it is believed that the construction and operation thereof will at once be apparent, it being noted that the several tread sections 1 and 2 are resiliently connected by the intermediately positioned coil springs 10 while the connected tread sections are anchored on the tire and felly by the shackle or clamp and the cables 20.

While there is herein shown and described the preferred embodiment of the present invention, it is nevertheless to be understood that minor changes may be made therein without departing from the spirit and scope of the invention as claimed.

What is claimed as new is:—

1. In a non-skid tread for vehicle wheels, a plurality of metallic tread sections having anti-skid tread faces, inwardly directed arms carried by each section, coil springs connecting the end arms of adjacent sections, cables connecting the several sections and a clamp for anchoring the sections to a wheel felly.

2. In a non-skid tread for vehicle wheels, a plurality of metallic tread sections having anti-skid tread faces, resilient connections between adjacent sections, a clamp attached to one of the sections and adapted to inclose a wheel felly and cables connecting the several sections and anchored to the clamp.

3. In a non-skid tread for vehicle wheels, a plurality of metallic tread sections having anti-skid tread faces, each section being transversely curved and having inwardly directed arms at each side adjacent the ends, coil springs connecting the end arms of adjacent sections, apertured lugs carried by the free ends of the arms, cables extending through the apertured lugs with one of their ends anchored to a tread section, and a clamp inclosing a wheel felly and secured to one of the tread sections with the other ends of the cables anchored thereto.

4. In a non-skid tread for vehicle wheels, a plurality of metallic tread sections having anti-skid tread faces, each section being transversely curved and having inwardly directed arms at each side adjacent the ends, coil springs connecting the end arms of adjacent sections, apertured lugs carried by the free ends of the arms, cables extending through the apertured lugs with one of their ends anchored to a tread section, a U-shaped clamp having the intermediate portion inclosing a wheel felly, a cushion buffer interposed between the clamp and felly, outwardly directed flanges carried by the arms of one of the tread sections, screw bolt connections between the clamp arms and flanges and apertured lugs carried by the clamp arms to which the other ends of the cables are attached.

In testimony whereof I affix my signature.

ANGELO PUGLIESE.